United States Patent [19]
Wagner

[11] 3,860,439
[45] Jan. 14, 1975

[54] FLAME RETARDANT PROCESS FOR CELLULOSICS

[75] Inventor: George M. Wagner, Lewiston, N.Y.

[73] Assignee: Hooker Chemicals & Plastics Corp., Niagara Falls, N.Y.

[22] Filed: Aug. 6, 1973

[21] Appl. No.: 385,782

Related U.S. Application Data

[63] Continuation-in-part of Ser. No. 244,574, April 17, 1972.

[52] U.S. Cl............... 117/62.2, 117/136, 117/137, 117/143 R
[51] Int. Cl............................................. B44d 1/44
[58] Field of Search........ 117/62.2, 136, 137, 143 R

[56] References Cited
UNITED STATES PATENTS

| | | | |
|---|---|---|---|
| 2,772,188 | 11/1956 | Reeves et al.................. | 117/136 |
| 2,983,623 | 5/1961 | Coates.............................. | 117/62.2 |
| 3,096,201 | 7/1963 | Coates et al...................... | 117/62.2 |
| 3,236,676 | 2/1966 | Coates et al...................... | 117/62.2 |
| 3,607,356 | 9/1971 | Beninate et al.................. | 117/137 X |

Primary Examiner—Michael Sofocleous
Assistant Examiner—Theodore G. Davis
Attorney, Agent, or Firm—Peter F. Casella; Donald C. Studley

[57] ABSTRACT

A process for imparting durable flame retardance to cellulose containing materials have been devised whereby materials which have been impregnated with a solution having a pH of from about 7 to about 9 and a tetrakis(hydroxymethyl) phosphonium hydroxide content of from about 10 to about 40 percent by weight and dried to a moisture content of from about 0 to about 8 percent, are aerated by blowing air through the dried material prior to polymerizing the monomer on and in the cellulose materials by exposure in an enclosed chamber to a atmosphere containing gaseous ammonia and thereafter contacting the material with water, as by a fine water spray, as it leaves the ammonia chamber. The monomer is rapidly and effectively polymerized on and in the cellulose containing materials thereby imparting flame retardance having improved durability to laundering to the materials in a rapid and efficient manner which is readily adaptable to high speed commercial textile processing machinery.

9 Claims, No Drawings

FLAME RETARDANT PROCESS FOR CELLULOSICS

CROSS REFERENCE TO RELEATED APPLICATION

This application is a continuation-in-part of copending application Ser. No. 244,574 filed Apr. 17, 1972.

FIELD OF INVENTION

This invention relates to an improved process for rendering cellulose-containing materials durably flame retradant. More particularly, it relates to a more rapid and hence more practical process for polymerizing tetrakis (hydroxymethyl) phosphonium hydroxide on and in cellulose-containing materials with ammonia to render them durably flame retardant. It relates also to an improved process for rapidly and efficiently polymerizing the monomer on and in the cellulose containing materials.

BACKGROUND OF THE INVENTION

In U.S. Pat. No. 3,607,356, it has been proposed to impregnate cellulose-containing materials with an aqueous solution containing an equilibrium mixture of tris(hydroxymethyl) phosphine ("THP") and tetrakis-(hydroxymethyl)phosphonium hydroxide ("THP") said solution having a pH of about 7 to about 8. In this process, the impregnated material containing form 10 to about 40 percent by weight of the monomer is dried to about 10 to about 20 percent moisture and then treated with gaseous ammonia in an enclosed cabinet to polymerize the resin monomers. The gaseous ammonia treatment step requires from one or two to 6 minutes exposure time depending upon the character, i.e., the weight, fibrous nature, etc., of the treated material. In many textile processes, the materials are processed in equipment operating at high speed in a continuous manner. Accordingly, operations involving processing times of several minutes duration require either static operation or untis of a size wherein such relatively long residence times can be obtained. It is, therefore, desired to process such materials in equipment wherein shorter residence times consistent with high speed continuous operations can be obtained in a practical manner. Moreover, the treatment according to the process of U.S. pat. No. 3,607,356, when used with available ammonia treatment cabinets, has been found to produce finishes on cellulosic materials which often tended to dust and the durability of the finished materials often failed to meet the stringent government standards (Department of Commerce Standard FF-3-71) which require that the treated materials withstand at least fifty home washing and drying cycles. The enclosed chamber for carrying out the ammonia treatment commonly used in this field comprises a series of perforated pipes housed in a box like enclosure having a large opening in the top. The partially dired impregnated material is passed over the perforated pipes through which ammonia gas is forced. The excess ammonia gas is vented through the opening in the top of the enclosure, and discharged into the atmosphere. This venting of considerable quantities of ammonia gives rise to a severe pollution problem. It can thus be seen that the process disclosed in U.S. Pat. No. 3,607,356 not only results in a highly inefficient utilization of ammonia but also is hardly practical for the lighter, open weave, materials and leaves much to be desired when processing heavier and/or close knit materials.

It is known, also, as disclosed in U.S. Pat. No. 2,983,623, to cure further polymerizable methylolphosphorus polymeric material containing at least one free methylol group attached to a phosphorus atom incorporated in a cellulosic material, by exposing said material in the dry state to the action of gaseous ammonia followed by subjecting it to an aqueous ammonia treatment. In this process, the further polymerizable resins disclosed are solutions of reaction products of tetrakis-(hydroxymethyl) phosphonium chloride and urea which solutions are relatively strongly acid and are applied in the presence of buffers which adjust the pH of the solutions to a pH within the range of about 3.5 to 4. The impregnated materials are thoroughly dried, exposed to ammonia gas for about 5 to 10 or more minutes, and then immersed in aqueous ammonia for about 10 or more minutes to complete the cure of the resin on and in the material. Such a process also requires relatively long time cycles of treatment especially in the aqueous ammonia bath and hence is hardly applicable with modern high speed processing techniques.

The problem of the long time cycles and efficiency of the polymerization has been substantially overcome by the apparatus and process disclosed in copending application Ser. No. 244,574 filed Apr. 17, 1972. In this application an apparatus and process for imparting flame retardance to cellulose containing materials is disclosed whereby materials which have been impregnated with a solution having a pH of from about 7 to about 9 and a tetrakis (hydroxymethyl) phosphonium hydroxide content of from about 10 to about 40 percent by weight are dried to a moisture content of from about 0 to about 8 percent and the monomer is polymerized in and on the cellulose material by exposure in an enclosed chamber to an atmosphere containing from about 50 to about 90 percent by volume of gaseous ammonia for about 5 to about 30 seconds. By this process and with this apparatus the momomer is rapidly and effectively polymerized on and in the cellulose containing material thereby imparting durable flame retardance to the materials in a rapid and efficient manner. Under certain mill conditions, especially where the cured fabric substantially immediately upon being exited from the ammonia chamber was batched in rolls or on trucks, it was noted that the odor of formaldehyde rapidly developed in the batched processed materials and also that a considerable exotherm was prevalent in the material. In such materials, i.e., when the odor of formaldehyde and/or an exotherm was noted, the durability of the flame retardant character was reduced. It is believed that the formaldehyde produced by decomposition of the polymerized or partially polymerized monomer when confined in the material reacted with the polymer or partially polymerized polymer to form a water sensitive reaction product which may deleteriously affect the durable character of the flame retardant treatment.

The process of the present invention represents an improvement over the process of the aforementioned Ser. No. 244,574 whereby the deleterious effect of the action of formaldehyde is obviated and thus a rapid and effective means of imparting durable flame retardance to cellulose containing materials is provided. Further said improved process is more generally applicable with the currently used high speed textile processing equipment and conditions.

OBJECTS OF THE INVENTION

It is, therefore, a principal object of the present invention to provide an improved process for treating cellulose-containing materials to render them durably flame retardant.

Another object is to provide a more rapid process for imparting flame retardant characteristics to cellulose-containing materials whereby said materials are impregnated with a solution of tetrakis (hydroxymethyl) phosphonium hydroxide, dried to remove substantially all of the retained moisture and rapidly and efficiently cured by gaseous ammonia.

A particular object is to provide a process which does not require in the curing step, prolonged exposure of the impregnated material to either large excesses of gaseous ammonia or aqueous ammonia or both.

An additional object is to provide a process whereby the deleterious effect of polymer degradation products on the treated material is substantially prevented.

These and other objects will be apparent to those skilled in the art by the following description of the present invention.

SUMMARY OF THE INVENTION

It has now been found that cellulose-containing materials can be rapidly and economically rendered durably flame retardant by a process which comprises:
 a. impregnating a cellulose-containing material with a solution of tetrakis (hydroxymethyl)phosphonium hydroxide having a pH of from about 7 to about 9, and containing from about 10 to about 40 percent by weight of tetrakis (hydroxymethyl) phosphonium hydroxide,
 b. drying the impregnated material, preferably under relatively mild conditions, to a moisture content of from about 0 to about 8 percent by weight,
 c. aerating the dried material by directing a current of air through the dried material,
 d. exposing the aerated material for a period of at least about 5 seconds but less than about 45 seconds to atmosphere containing at least about 50% by volume of ammonia to cure the phosphorus containing resin in and on the material, and
 e. contacting the material with water preferably in the form of a fine water spray as it emanates from the ammonia atmosphere to render the material durably flame retardant.

The curing step of the new process may be carried out in an enclosed cabinet which comprises
 a housing;
 gas inlet means disposed in the upper portion of said housing;
 gas outlet means disposed in the lower portion of said housing;
 material inlet means and material outlet means disposed in the lower portion of said housing above said gas oulet means;
 partition means disposed in said housing between said gas inlet means and said gas oultet means so as to form a gas treatment chamber in the upper portion of said housing, said partition means including means for permitting the introduction into and removal from said gas treatment chamber of textile material to be treated in said chamber while minimizing the passage of gas into and from said gas treatment chamber; and
 means disposed in said gas treatment chamber for supporting textile material to be treated. Cabinets of this design are disclosed in copending application Ser. No. 244,574 filed Apr. 17, 1972.

The ammonia treated material obtained in accordance with the present invention may be washed and dried numerous times without substantial loss of fire retardancy.

DETAILED DESCRIPTION OF THE INVENTION

In accordance with a preferred mode of carrying out the improved process of this invention, an aqueous solution of tetrakis (hydroxymethyl) phosphonium hydroxide containing from about 10 to about 40 percent by weight of tetrakis(hydroxymethyl) phosphonium hydroxide and having a pH of from about 7 to about 9 is prepared and used to impregnate a cellulose-containing material, the impregnated material is dried to about 0 to about 8 percent moisture, the dried material is aerated substantially immediately after leaving the drier by directing a current of air through the material, preferably suction, said material is then exposed for at least about 5 to less than about 45 seconds and preferably for about 15 to about 30 seconds to an atmosphere containing at least about 50 percent by volume of ammonia, and preferably from about 70 to about 95 percent of gaseous ammonia, and the material is contacted substantially immediately after leaving the curing step with water preferably in the form of a fine water spray, in an amount sufficient to provide a pick-up of from about 10 to about 40 percent by weight of water. The thus treated material containing an insoluble polymer of the phosphonium compound in and on the material is scoured, washed and dried.

The treatment of the dried impregnated material with ammonia, i.e., the curing step, is carried out in an enclosed chamber wherein the impregnated material is exposed to a gaseous atmosphere containing a high concentration, i.e., above about 50 percent by volume, of ammonia. The material is preferably passed into and out of the chamber, in a continuous manner and at a relatively high speed, so that the material is exposed to the ammonia atmosphere for at least 5 seconds and preferably from about 15 to about 30 seconds.

The improved process of this invention differs from the process disclosed in the aforementioned Ser. No. 244,574 in two respects. In the instant process the impregnated material after being dried is aerated by directing a current of air through the dired material, and also the material, after passing through the ammonia curing cabinet, is exposed to, or contacted by water e.g., a fine water spray. By conducting the process in this manner the problems caused by the presence of formaldehyde in the dried uncured impregnated material and also after the curing of the monomer on and in the cellulosic material can be substantially obviated.

It is believed that formaldehyde may be formed by decomposition of the unploymerized monomer, probably tetrakis (hydroxymethyl) phosphonium hydroxide, and that this formaldehyde methylolates the phosphonium materials to form a water soluble reaction product. By removing at least a major portion of this undesirable formaldehyde from the dried material prior to the curing step by aeration, which serves also to rapidly cool the hot dried material emanating from the drier and subsequently rapidly cooling the material after curing with ammonia (an exothermic reaction) it is believed that the problems caused by the undesirable formation of formaldehyde can be substantially prevented.

The aeration step can be carried out by passing the material after drying over a perforated plate or pipe through which a strong current of air is continuously blown or sucked. Preferably the air current is moved by suction. Conveniently this aeration means is located as close as possible and/or convenient to the material exit of the drier. The material is passed over the perforated or slotted air distribution means, a plate, pipes or series of pipes, extending over the width of the fabric and a current of air, flowing at about 1000 to 3000 cubic feet per minute, is caused to pass through the material. The time required for this operation is not critical and in general the material is exposed to the current of air for about 0.5 to about 2.0 seconds or more. As will be apparent, the speed of the material running through the processing equipment will determine the exposure time, and is a function of the volume of air and speed of the material. By this means any formaldehyde present in the dried material is rapidly removed by the current of air and also the material is rapidly cooled thereby reducing the formation of additional formaldehyde occasioned by the probable decomposition of the phosphonium compounds.

Following the curing step, the material is contacted with water preferably in the form of a fine water spray. Several means for accomplishing this step will be obvious to those skilled in this art. For example a spray head or several heads are positioned as close as possible and convenient to the material exit means from the curing cabinet. Most preferably the spraying means is one or several air atomizing water spray heads which are used to supply the water in the form of a atomized spray to the material exiting from the ammonia curing cabinet. Sufficient water should be added to the material to provide a pick-up of about 10 to about 40 percent by weight and preferably from about 20 to about 30 percent by weight pick-up of water. This water not only cools the hot material exiting from the curing cabinet but also results in the immobilization of formaldehyde, if present, and thus prevents its further reaction with the phosphonium salt polymer.

It is believed that the water supplied in this manner and at this stage of the process provides a reaction medium for the formaldehyde to react with ammonia which may be present to form hexamethylene tetramine which latter product does not react with the phosphonium salt polymer present in and on the material.

Thereafter the treated material having the insoluble polymer deposited therein may be scoured or oxidized, washed and dried. Alternatively the treated material can be batched in rolls or on trucks and held for furher treatment. When the latter procedure is used, the batched material in rolls or on trucks does not develop a formaldehyde odor nor does an exotherm develop in the batched material.

The treated material having the insoluble polymer deposited therein is then oxidized, washed and dried in the usual manner.

The cellulose materials which can be treated to impart flame retardant properties thereto in accordance with this invention include cotton, rayon, paper, jute, ramie, wood and mixtures thereof, as well as blends of cellulosics, such as cotton or rayon with synthetic materials, such as nylon, polyesters, acrylics, and with proteinaceous fibers, such as wool, silk, and the like. The process of this invention is particularly effective when applied to the treatment of cellulosic-containing materials such as cotton and rayon.

The solution used to impregnate the cellulose-containing material comprises tris(hydroxymethyl) phosphine and tetrakis(hydroxymethyl) phosphonium hydroxide as an equilibrium mixture. Such a solution is well known in this art and can be prepared by reacting a aqueous solution of tetrakis(hydroxymethyl) phosphonium chloride with an approximately equimolar quantity of an organic or inorganic base, preferably sodium hydroxide. The pH of the final solution is adjusted to from 7 to 9, preferably to from 7.0 to 8.1 and especially from 7.0 to 7.5. For the purpose of this invention, the active component of the aqueous solution is considered to be tetrakis(hydroxymethyl) phosphonium hydroxide. Hereinafter, the active component will be expressed in terms of this component, although it is probable that there is present a mixture of tris(hydroxymethyl) phosphine and tetrakis-(hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet-pick up of from about 50 to about 200 percent may suitably be used, preferably the material contains about an equal weight, i.e., about 100 percent pick-up, of the treating solution.

The impregnated material is then dried to a residual moisture content of about 0 to about 8 percent and preferably from about 0 to about 3 percent. The drying is carried out in air or in drying oven at temperatures which may vary from ambient to about 125° centigrade. Excessive drying temperatures and times are to be avoided. The drying time may vary according to the drying temperature and also the weight and fibrous nature of the material, as will be obvious to those skilled in this art. The moisture content of the material may be measured by a suitable moisture meter.

The dried material is then aerated as described above by passing a current of air through the material as soon as possible or convenient after leaving the drier. Essentially all of the free formaldehyde which may be present in the dried material is removed from the material.

The aerated impregnated material next is exposed to gaseous ammonia in an enclosed chamber wherein the resin monomer reacts rapidly and substantially completely to form and insoluble polymer within the material. The gaseous atmosphere which comprises at least about 50 percent of gaseous ammonia, and preferably from about 70 to about 95 percent or more of gaseous ammonia provides an effective, efficient and surprisingly rapid reactant for the resin curing step. It has been found that the curing step is completed, under these conditions, in less than about 45 seconds and generally less than about 30 seconds, and as low as 5 seconds, whereas in prior art procedures from about 1 to about 6 minutes were required for substantially complete polymerization and curing of the impregnated composition. Under optimum conditions, the procedure of this invention proceeds with the efficient utilization of the gaseous ammonia charged to the process whereas prior art processes often referred up to a 15 fold excess of the ammonia reactant. This huge excess of ammonia presented a serious air pollution problem, which in the present process and apparatus has been eliminated by the highly efficient utilization of the ammonia.

Following the polymerization and/or curing operation, the treated material is contacted with water, preferably in the form of a fine water spray, as described above. This water spray, which is most preferably delivered to the material in the form of an air atomized spray effectively cools the fabric and also immobilizes any formaldehyde present in the material. Thereafter the wetted material which contains about 10 to about 40 percent by weight of moisture pick-up is preferably oxidized or scoured, or washed to remove unpolymerized materials and the like. Where the present invention is carried out on yard goods using mill apparatus, this scouring operation may be effected using any of the conventional scouring processes souring processes such as rope scouring, open width scouring, jig scouring and the like. The scouring may be conveniently carried out using, e.g., an aqueous soap solution containing small amounts of sodium carbonate, perborate or peroxide, and synthetic detergents. Preferably this scouring is carried out immediately after the step of contacting the material with water.

Alternatively, the wetted material can be batched in rolls or in trucks and held for extended periods. When so handled, i.e., batched, the material does not develop formaldehyde odors nor does an exotherm develop. Thus following the water wetting step of this process, the material is essentially completely processed, except for the normal and conventional scouring etc. treatments and the flame retardant character is durably imparted thereto. Since in many mills the scouring and other final operations are carried out at points remote from the impregnation drying and curing operations, it is usual in this industry to batch the polymerized or cured materials in rolls or trucks and thereafter to deliver the batched materials to the area where the scouring and other finishing operations are carried out. Since hours or days may elapse it can be seen that the process of this invention provides an efficient and economical means for preventing the deterioration of the flame retardant treatment prior to finishing the material.

The scouring step may be followed by conventional washing and drying operations and thereafter the dried treated material may be subjected to any normal finishing operation such as sanforizing, calendering, and the like.

The flame retardant cellulose-containing materials treated in accordance with the procedures set forth above have been found to be durably flame retardant, even after 50 or more home laundering and drying cycles. Additionally, such materials are substantially free from dust and have a tear resistance, tensile strength, and hand which are substantially unchanged from those of untreated materials.

The process of this invention is readily adaptable to modern high speed commerical textile processing equipment. Substantial savings of time and of consumption of ammonia gas, in the range of about 100 to 200 percent, are effected by this improved process. Additionally, the present process prevents the deterioration of the flame retardant character imparted to the material which may occur between the curing step and the scouring and other finishing steps.

The following examples will illustrate the process of the present invention. In these examples, as well as in the above specification and the claims hereinafter set out, parts and percentages are by weight and temperatures are given in degrees Fahrenheit, unless otherwise specified. The durability of the flame retardancies reported by accelerated boil test and the 50 home washes test were determined in accordance with the procedure of the United States Department of Commerce test procedure No. DOC FF-3-71.

EXAMPLE I

An aqueous solution containing about 32 percent tetrakis (hydroxymethyl) phosphonium hydroxide and having a pH of 7.4 was used to impregnate 6000 yards of white cotton sheeting material, (3 yards/lb), at the rate of 60 yards per minute. The impregnated material was passed through squeeze rolls to give a wet pick-up of about 100 percent. The impregnated material was dried in a 225° oven for 30 seconds and then within about 20 seconds exposed in an enclosed cabinet for about 15 seconds to an atmosphere consisting of 95 percent by volume of ammonia and 5 percent by volume of air. The treated material after emanating from the ammonia treatment cabinet was batched in a roll. After being held in the roll for about 24 hours, the material was tested for flame retardance, after being subjected to the usual oxidation, washing, and drying steps, and failed both the accelerated boil test and the 50 home washed test.

The "accelerated boil test" as a measure of the flame retardant character of the material is carried out by heating the dried cured material for 45 minutes in a solution containing 90 parts of soap, 90 parts soda ash, and 10 parts of a synthetic anionic detergent in about 50,000 parts of water and rinsed in hot (145°) water for 15 minutes, repeating the heating and rinsing nine times ("9 boil cycles"). This "accelerated boil" test is roughly equivalent to at least fifty home washing and drying cycles.

EXAMPLE II

For comparison a 30,000 yard run of a printed cotton material, 3 yards/lb, was continuously processed at the rate of about 60 yds/min. by running into an aqueous bath containing about 32 percent tetrakis (hydroxymethyl) phosphonium hydroxide and having a pH of 7.4. The impregnated material was passed through squeeze rolls to give a wet pick-up of about 100 percent and into a 230° oven (residence time about 30 seconds). The dried material was passed from the oven over a slotted plate about 36 inches long through which air at the rate of about 2,000 cfm was being moved upwardly through the material by suction. The dwell time of the fabric moving at the rate of 60 yards/minute over the slotted plate is about one second. The aerated material was passed into an enclosed cabinet where it was exposed for about 15 seconds to an atmosphere consisting of about 95 percent by volume of ammonia and 5 percent by volume of air. The treated material was contacted substantially immediately after exiting from the cabinet with an air atomized water spray sufficient to result in a pick-up of about 25 percent water. The material was batched in rolls and held for about twenty four hours. Samples of the materials thus treated and after the usual oxidation washing and drying operations were found to be flame retardant i.e., they passed both the accelerated boil test and the 50 home washes test.

EXAMPLE III

The procedure of Example II above was repeated except that in the aeration step following the drying step, the direction of the air stream was reversed, that is the air stream was blown through the dried impregnated materail instead of being pulled through by suction. The speed of the material was increased slightly also from 60 yards per minute to 65 yards per minute. The thus treated batched material, after standing in rolls for about 24 hours, after being scoured, washed and dried, was tested and found to be durably flame retardant by both the accelerated boil and 50 home washes test.

EXAMPLE IV

The procedure of Example III was repeated except that the step of spraying the material emanating from the ammonia curing chamber with water was omitted and also only 19,000 yards of material were treated in this manner. The material was batched in rolls and permitted to stand for about 24 hours and then after being scoured, washed and dried tested for flame retardance.

The material failed both the accelerated boil test and the 50 home washes test indicating that the material treated as described in this example was deficient in durable flame retardant character.

The above examples clearly show the improvement in durability of the flame retardant treatment which results from a process wherin cellulose material which has been impregnated with an aqueous solution of tetrakis (hydroxymethyl) phosphonium hydroxide, dried, and thereafter cured by exposure to gaseous ammonia, is aerated after being dried, and also sprayed with water after curing. These results indicated also that both the aeration and water spray treatments are necessary to obtain consistently the durable flame retardance required by the current goverment standards.

The present invention has been described and illustrated in the above specification and examples with reference to several specific embodiments. Such reference has been made for purely illustrative purposes and various modifications in the details therein included can be made without departing from the scope and spirit of the invention, as will be obvious to those skilled in this art.

What is claimed is:

1. A process for imparting flame retardant character to cellulose containing material which comprises
   1. impregnating a cellulose-containing material with an aqueous solution having a pH of from about 7 to about 9 and containing from about 10 to about 40 percent by weight of tetrakis(hydroxymethyl) phosphonium hydroxide compound;
   2. drying the thus impregnated material to about 0 to about 8 percent moisture retention;
   3. aerating the dried impregnated material by passing air through said material;
   4. exposing said aerated material to an atmosphere containing at least about 50 percent by volume of gaseous ammonia in an enclosed chamber for a period of from about 5 to less than about 45 seconds to polymerize the phosphonium compound in and on the cellulose containing material, and
   5. contacting the material exiting from said enclosed chamber with water in an amount sufficient to provide a pick-up of water by the material of from about 10 to about 40 percent by weight.

2. The process of claim 1 wherin the impregnated material is dried to from about 0 to percent to about 3 percent moisture retention.

3. The process of claim 1 wherein the dried material is exposed to an atmosphere containing from about 70 to about 95 percent ammonia by volume in an enclosed chamber for about 15 to about 30 seconds.

4. The process of claim 1 wherein the air stream used in said aeration step is moved by suction through the material.

5. The process of claim 1 wherein the air stream used in said aeration step is moved by blowing the air through said material.

6. The process of claim 1 wherein the water used to contact the material after exiting from said enclosed chamber is a fine water spray.

7. The process of claim 6 wherein the water used to contact the material after exiting from said enclosed chamber is an air atomized water spray.

8. The process of claim 7 wherein the material is contacted with suffcient water to result in a pick-up of from about 20 to about 30 percent by weight of water.

9. The process of claim 1 wherein the cellulose containing material is a cotton textile material.

* * * * *